3 Sheets—Sheet 1.

F. E. CASE.

SURGICAL CHAIR.

No. 10,906. Reissued Mar. 6, 1888.

Witnesses.

James A. DuHamel

Horace A. Dodge.

Inventor:

Frank E. Case, by his Attys.

Dodger Bros.

F. E. CASE.

SURGICAL CHAIR.

No. 10,906. Reissued Mar. 6, 1888.

Witnesses:
James F. DeHamel
Horace A. Dodge.

Inventor:
Frank E. Case,
by his Attys.
Dodger & Sons.

F. E. CASE.

SURGICAL CHAIR.

No. 10,906. Reissued Mar. 6, 1888.

Witnesses:
James F. DeHamel.
Horace A. Dodge.

Inventor:
Frank E. Case,
by his Attys.,
Dodget Sons.

UNITED STATES PATENT OFFICE.

FRANK E. CASE, OF CANTON, OHIO.

SURGICAL CHAIR.

SPECIFICATION forming part of Reissued Letters Patent No. 10,906, dated March 6, 1888.

Original No. 360,279, dated March 29, 1887. Application for reissue filed October 18, 1887. Serial No. 252,762.

*To all whom it may concern:*

Be it known that I, FRANK E. CASE, a citizen of the United States, residing at Canton, in the county of Stark and State of Ohio, have invented certain new and useful Improvements in Surgical Chairs, of which the following is a specification, reference being had therein to the accompanying drawings.

My invention relates to surgical chairs; and it consists in various novel features of construction by which the chair is rendered capable of adjustment in a variety of ways, as hereinafter fully pointed out.

Figure 1:
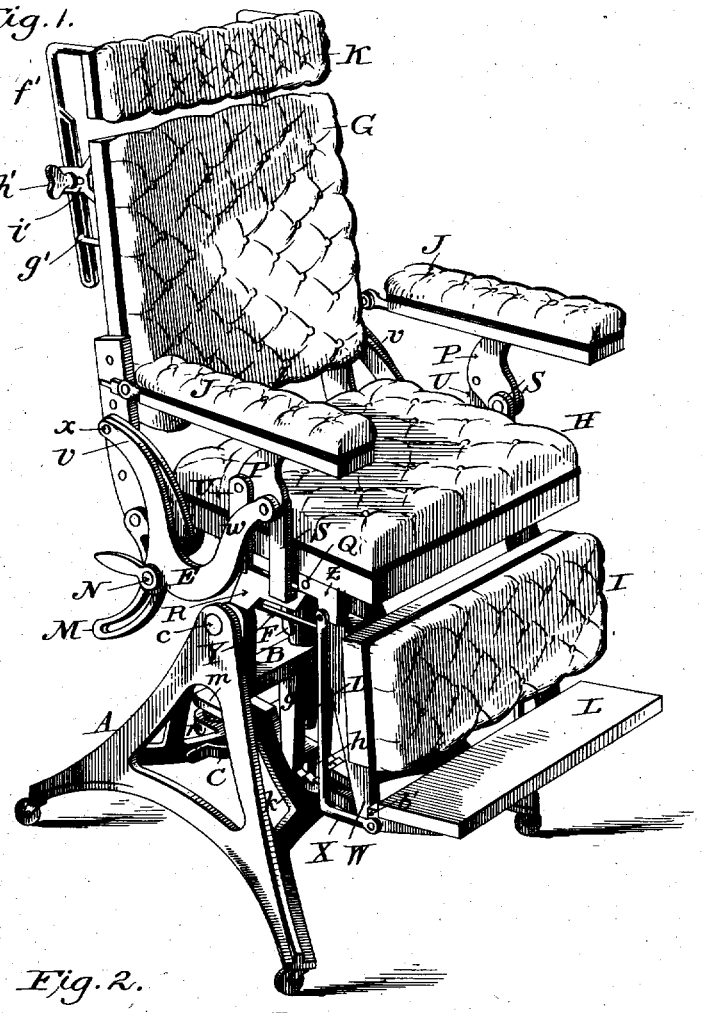
Figure 2:
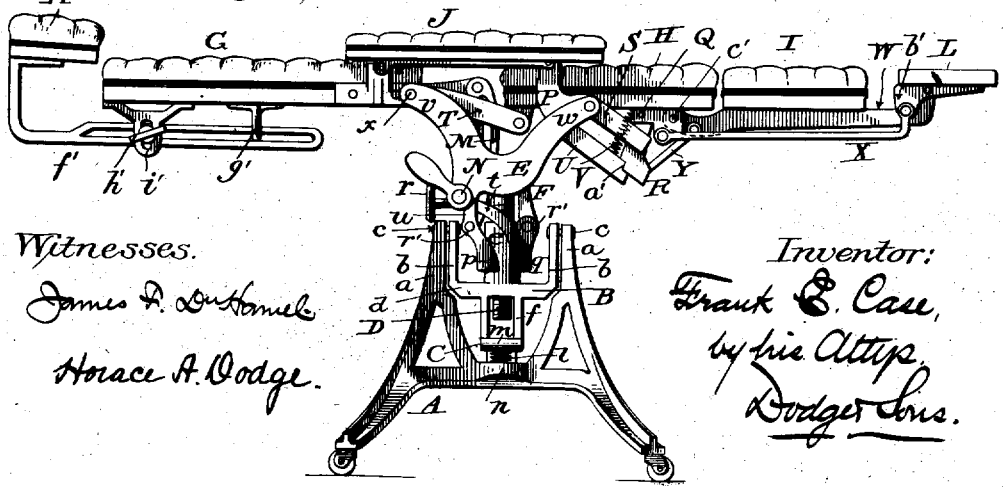
Figure 3:
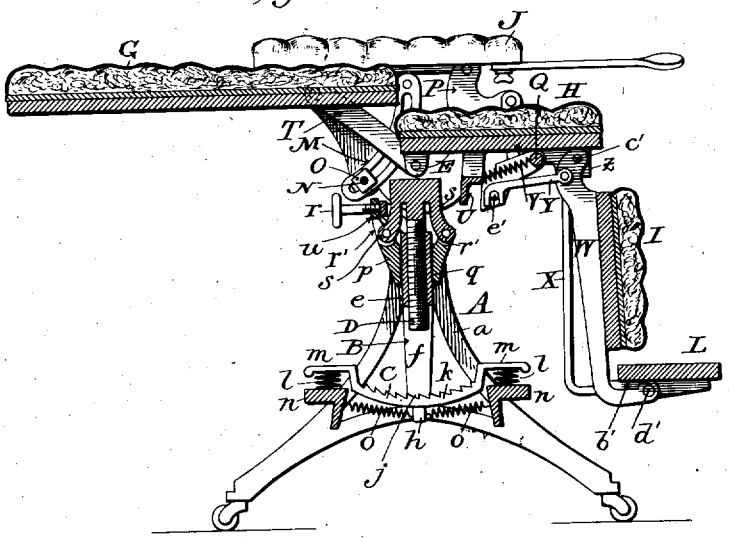
Figure 4:
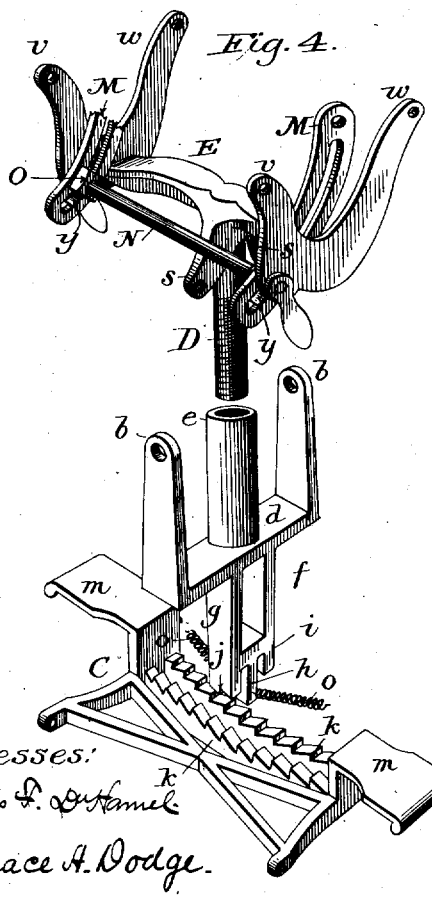
Figure 5:
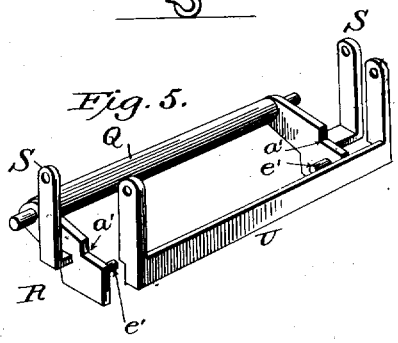
Figure 6:
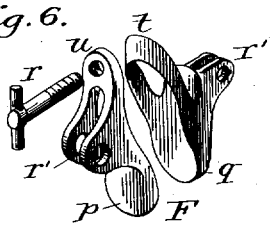
Figure 7:
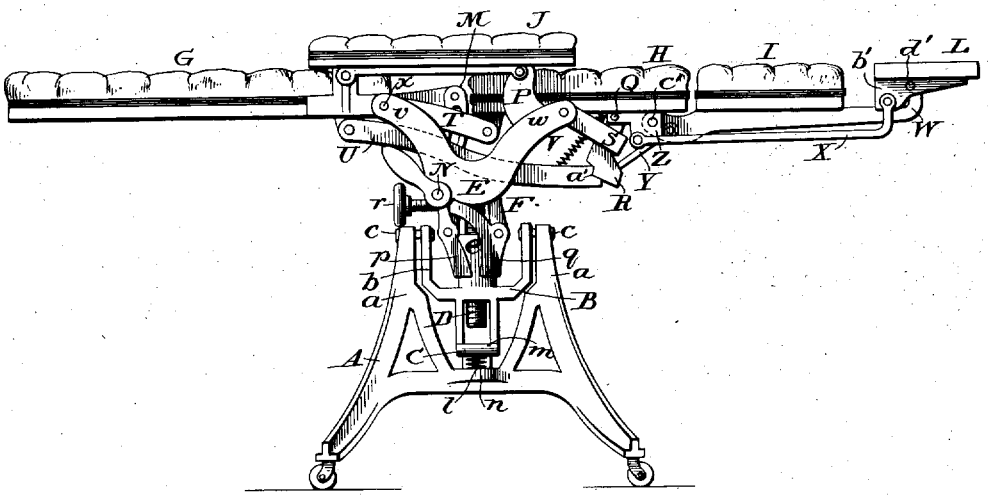

In the accompanying drawings, Figure 1 is a perspective view of my improved chair in its normal adjustment; Fig. 2, a side view showing the back, the head-rest, and the foot-rest thrown into the same horizontal plane; Fig. 3, a vertical sectional view in which the back is shown in a horizontal position and the foot-rest dropped down to its normal position; Fig. 4, a perspective view showing the main supporting parts separated and raised one above another to illustrate their relative positions and the manner of assembling them; Figs. 5 and 6, perspective views of certain details; Fig. 7, a view illustrating a slight modification.

As is well known, surgical chairs are required to be adjusted to a great variety of positions, so as to bring the patient to a sitting, reclining, or lying position, to raise and lower the head or the feet simultaneously or independently, to tip or turn the patient to either side, and, generally, to secure any position necessary for convenient treatment or manipulation by the surgeon. These objects I attain in an efficient manner and with ease and expedition by the construction shown in the annexed drawings.

In said drawings, A indicates a base or frame, which is preferably made with four feet, well spread apart to give stability and freedom from liability to overturn. The feet are advisably furnished with casters for convenience in moving the chair about.

As best shown in Figs. 1 and 2, the base or frame A is formed with two upright side arms or standards, *a a*, between and to which is hung a yoke, B, the form of which is shown clearly in Figs. 2 and 4. As shown in said figures, the yoke or swinging frame B has two upright arms, *b b*, which when the yoke is in position fit close to the inner faces of the standards or upright arms *a a* of the base, to which they are attached by pivot bolts or pins *c c*, Figs. 1 and 2.

From the horizontal cross-bar *d*, which connects the arms *b b* of the yoke, a central tubular neck, *e*, rises to about the height of said arms, as shown in Fig. 4, and beneath said bar, and in line with the neck *e*, a depending extension, *f*, is formed, the lower end of which is divided into three parts or branches, *g*, *h*, and *i*, separated one from another a short distance. The outer branches, *g* and *i*, are notched or beveled to form teeth *j*, those of one branch facing in a direction opposite to those of the other branch, as shown in Fig. 4. These teeth are designed to engage with two bars or racks, *k k*, having similarly-reversed teeth, which racks are formed upon a locking-frame, C, pivoted in base A and having a limited vertical movement therein. The locking-frame C is normally held up in engagement with the teeth *j j* by means of springs *l*, placed beneath projecting ears *m* and resting upon cross bars or braces *n* of the base-frame A.

The rack-bars *k k* are separated to correspond with the branches *g i* of the depending extension *f* of the swinging frame B, and the middle branch, *h*, of said extension passes between said bars, which thus serve to retain the parts in proper relation and to guide the depending extension *f* in its movement over the rack.

So long as the locking-frame is held up by the springs *l* the teeth *k k* are held in engagement and the swinging yoke B is held against movement; but by pressing down upon either of the ears *m m* of the locking-frame C, which may be done from either side of the chair, the parts are disengaged and the yoke B is made free to be swung in either direction.

To prevent the yoke B and the body of the chair which is carried thereby from falling over of its own weight when the yoke is thus unlocked, I attach to the front and rear sides of the middle branch, *h*, of the depending extension *f* springs *o*, the outer ends of which are carried and attached to opposite sides of the base-frame A. These springs counterbalance each other when the yoke B is in a vertical position, and consequently tend to maintain it in such position and to bring it back thereto whenever it is swung to one or the other side. Of course the springs *o* can only act when the teeth *j* and racks *k* are out of engagement.

The tubular neck *e* of yoke B is threaded internally to receive a correspondingly-threaded stem, D, which carries at its upper end the rotary frame E, which supports the body of the chair. The screw permits the height of the chair to be varied as desired, as in other chairs of like construction.

It is desirable, and, in fact, is necessary, in surgical chairs to provide means for locking the parts so that the body shall for the time be incapable of rotation, and for this purpose I provide the clamp F. (Illustrated in Figs. 2, 3, and 6.) This clamp consists of three parts, *p*, *q*, and *r*. (Shown separated in Fig. 6 and in operative position in Figs. 2 and 3.) The parts *p* and *q* are levers provided with perforated ears *r'*, by which they are connected with similarly-perforated lugs *s*, formed upon and depending from the rotary frame E on opposite sides of the screw-stem D. The part *q* is made with a loop or band, *t*, which encircles the screw-stem and the neck *e*, and the part *p* is provided above its pivot with a threaded hole, *u*, to receive the thumb-screw *r*, which forms the third part of the clamp, and which, by bearing against the loop *t*, forces the upper ends of parts *p q* apart, throws their lower ends toward each other, and causes them to firmly clasp the neck *e* of the yoke B. As the yoke cannot rotate, and as the parts *p q* are pivoted to the rotary frame, said frame and yoke are firmly held together and the frame is held against rotation. Thus it will be seen that provision is made for swinging the chair-body, which is carried by the rotary frame, from side to side, or, by turning it more or less, for swinging it forward or backward or at any intermediate angle, and also for raising and lowering it and for locking it at any elevation against rotation.

It now remains to explain the construction and operation of the body, head-rest, and foot-rest.

As shown in Figs. 1, 2, and 4, the rotary frame E consists of a substantially-horizontal cross-bar somewhat longer than the width of the chair seat and back, and having at its end an upright or vertical portion consisting of two arms or branches, *v* and *w*.

The body of the chair consists of a back, G, a seat, H, a leg-rest, I, and arms J, and to these three parts are added a head-rest, K, and foot-rest L.

The back G is supported between the arms *v* by pivots *x*, on which it may be tipped to any position from vertical to horizontal.

To hold the back rigidly at any desired adjustment, I pivot to its lower end at one or at both sides, preferably both sides, a slotted link, M, advisably curved, as shown. A rod, N, passes through the link or links and is journaled at its ends in lugs formed on the rotary frame E, as clearly shown in Figs. 1, 2, and 4, both ends of said rod being furnished with a hand-piece or lever, so that it may be controlled from either end. The rod is threaded near each end, the direction of the threads at opposite ends being reversed, one being right and the other left. Upon each threaded portion is placed a correspondingly-threaded nut, O, having a lug, *y*, extending into the slot of the link M, against which the nut rests, the lug serving to prevent the nut from turning with the rod. From this construction it follows that if the rod be turned in one direction it will cause the nuts to be drawn forcibly against the links, clamping the latter between the nuts and the end plates of the rotary frame, while if the rod be turned in the other direction the nuts will be moved back and the links released, leaving the back free to be adjusted.

The arms J are jointed to the back G above the pivotal supports of the latter, and they are similarly jointed to L-shaped blocks or levers P, which are in turn pivoted to the forward arms, *w*, of the rotary frame E. By reason of this arrangement and manner of supporting the arms they are caused to rise and fall with the back, and the blocks or levers P are caused to move with the back and arms.

To the under side of the seat H, near the front thereof, are secured two hangers, *z*, in which are journaled the ends of a rod or shaft, Q, of a swing-frame, R, which is hung by links S from the arms *w* of the rotary frame E, and which links are thus caused to sustain the front of the seat, as shown in Figs. 1, 2, and 3, the swing-frame and hangers being also shown in Fig. 5. The rear of the seat is supported by links T, hung from the rear arms, *v*, of the rotary frame on the same pivots that support the back.

U indicates a swinging brace pivotally attached to the blocks P at or near the angle formed by the meeting of the two arms of said blocks, as best shown in Fig. 1. This brace is constantly drawn toward the swing-frame R by a spring, V, which is attached at one end to the brace and at the other end to the rod Q. The purpose of this brace is to hold the swing-frame R in the proper position relatively to the other parts, and thereby to bring about and maintain a certain desired relation between the back and seat.

As shown in Figs. 1, 2, 3, 4, and 5, the side or end pieces of the swing-frame R are notched or formed with shoulders *a'*, in or with which the swinging end of the brace U engages when the frame R is drawn back sufficiently to permit such engagement. When the parts mentioned are thus in engagement, if the back G be thrown downward to or toward a horizontal position, carrying with it the arms J and the levers or blocks P, the brace U, moving with the blocks P and bearing upon the swing-frame R, causes said frame to swing about its point of attachment to the arms *w* of the rotary frame, and in this way the seat is elevated to the level which the back assumes when taking a horizontal position. The links T also swing upon their pivots and cause the rear of the seat to move with the front, and thus to maintain a proper horizontal position.

Whenever it is desired to drop the seat to its normal level without raising the back, it is only necessary to throw the brace U out of engagement with the frame R, as shown in Fig. 3, whereupon the seat will drop to the position there shown.

Pivoted to the hangers *z* are two metal bars, W, to which is secured the leg-rest I, and to the lower outwardly-bent ends of which the foot-rest L is pivoted, as shown in Figs. 1, 2, and 3.

The leg-rest is a fixture upon the bars W, and is merely a level surface, either upholstered or of cane, rattan, or other suitable material to correspond with the seat and back, which may of course be finished in any desired manner. The foot-rest is simply a flat board or platform of wood or metal, and is formed with ears or lugs *b'*, extending backward in rear of its pivots. To each of these ears or lugs I attach one end of a rod or brace, X, the other end of which is attached to one of the hangers *z*, as shown in Fig. 7, at the same distance from the pivot *c'* of bar W as the lower end of the brace is from the pivot *d'* of the foot-rest. This construction and arrangement causes the foot-rest to maintain at all times a horizontal position, regardless of the inclination of the leg-rest, the position of the seat, or that of the back.

The bars W are each provided with a swinging hook, Y, adapted to engage with a stud or pin, *e'*, of which there is one on the inner face of each end plate of swing-frame R. When the hooks are locked upon the studs or pins, they cause the leg and foot rests to move with the swing-frame R; hence whenever the brace U is in engagement with said frame and the back is thrown down the seat is raised into the same plane with the back, and the leg-rest and foot rest are raised to the same horizontal plane, thus forming one continuous level surface, as in Fig. 2.

If it be desired to drop the leg or foot rests, the hooks Y are disengaged from the studs or pins *e'*, and then said parts may be lowered to the position shown in Figs. 1 and 3.

The head-rest K is carried by two slotted bars, *f'*, moving in guides or eyes *g'* at the back of the chair, and by clamping-screws *h'*, passing through slotted brackets *i'* and serving to bind and hold the bars wherever adjusted. By this arrangement I am enabled to set and fasten the head-rest wherever desired and to throw it forward or backward more or less.

Instead of pivoting the brace U to the levers or blocks P, it may be pivoted directly to the lower end or edge of the back G. So, too, instead of employing two slotted links for holding the back at the desired angle, a single link may be employed.

Having thus described my invention, what I claim is—

1. The herein-described chair, consisting of base A, yoke B, suspended within said base, locking frame C, adapted to hold yoke B against swinging, rotary frame E, carried by said yoke, back G, pivoted in the rotary frame, blocks or levers P, pivoted to the front of the rotary frame, arms J, connecting said levers with the back, seat H, suspended from rotary frame E by swing-frame R, brace U, pivoted to the blocks or levers P, links T, supporting the rear edge of the seat, arms W, provided with leg-rest I, foot-rest L, pivoted to arms W, and rod or brace X, attached at its lower end to the foot-rest and at its upper end to the seat, all substantially as described and shown.

2. In a chair, the combination of a base, A, a yoke, B, suspended therein, adapted to support the chair-body, and provided with a depending extension, *f*, having branches *g h i*, the branches *g* and *i* provided with teeth *j*, and locking-frame C, provided with toothed racks *k k*, adapted to engage the teeth *j* to hold the yoke at any desired inclination.

3. The combination, substantially as set forth, of base A, swinging yoke B, carrying the chair-body and provided with a downward extension having toothed branches *g* and *i* and intermediate branch, *h*, springs *o*, attached to the base and to the opposite sides of the branch *h*, locking-frame C, pivoted to base A and provided with reversed racks *k*, and springs *l*, serving to hold the racks in engagement with the teeth *j*.

4. In combination with a base and with a threaded tubular neck, *e*, a threaded stem, D, fitting said neck, a frame carried by said stem and adapted to support the body of the chair, and a clamp carried by said frame and adapted to clasp the tubular neck, whereby the frame and neck may be locked together and the former prevented from turning independently of the latter.

5. The combination of a base and a tubular threaded neck supported thereby, a threaded stem, D, a frame, E, carried by said stem, and a clamp, F, consisting of the parts *p q*, pivotally attached to said frame and adapted to bear against the opposite sides of the tubular neck, and the screw-stem *r*, passing through the part *p* and bearing against the loop *t* of part *q*, substantially as shown.

6. In a chair, the combination of a base, a yoke or frame suspended in said base, a stem free to rotate in said yoke and serving to support the body of the chair, a clamp adapted to lock said stem against rotation, and a locking device adapted to engage the swinging yoke and to hold it at any desired inclination, whereby the body of the chair may be tipped to any desired angle forward, backward, or to either side.

7. In combination with a supporting-frame, the back G, provided with slotted links M, nuts O, having lugs *y*, seated in the slots of the links, and threaded rod N, passing through the nuts, the slots, and the supporting-frame, and adapted to bind the parts together.

8. The combination, with a supporting-frame having arms *v* and *w*, of back G, pivoted to the arms *v*, blocks or levers P, pivoted to arms *w*, arms J, connecting back G and levers P, seat H, swing frame R, pivotally attached to the seat, brace U, pivoted to the blocks or levers P and adapted to engage with swing-frame R, and links T, connecting the arms *v* and the rear side of seat H, whereby the seat is caused to rise as the back is depressed.

9. In combination with a supporting-frame, back G, pivoted therein, seat H, connected at its rear edge to the arms *v* by links T, swing-frame R, hung in bearings carried by the seat and suspended from the supporting-frame, levers or blocks P, pivoted to said frame, arms J, connecting the levers P and the back, bars W, pivotally attached to the seat and provided with hooks Y, to engage with studs *e'* on the swing-frame R, leg-rest I, secured to said bars, foot-rest L, pivoted to the bars W, brace-rod X, attached to the seat and to the foot-rest, and brace U, attached to blocks P and arranged to engage with the frame R.

10. The combination, with a base and a frame, E, of back G, pivoted in said frame, levers or blocks P, also pivotally attached thereto, arms J, connecting back G and levers P, seat H, swing frame R, hung in bearings attached to the seat and suspended by links S from frame E, brace U, pivoted to levers P, and links T, connecting the seat and back, substantially as shown and described.

11. The combination, substantially as set forth, of a supporting-frame, a seat, bars W, hung from said seat and carrying a rest for the limbs, a swing frame, R, hung in bearings carried by the seat and provided with studs *e'*, hooks Y, attached to the bars W and adapted to engage with said studs, and a swinging brace, U, adapted to engage with or disengage from frame R at will, whereby the rest may be held in a horizontal or vertical position, as required.

12. In combination with a surgical-chair body having guides *g'*, slotted brackets *i'*, and clamping-screws *h'*, head-rest *k*, provided with slotted bars *f'*, whereby the rest may be raised and lowered, brought forward, or thrown back, at will.

13. In a surgical chair, the combination of a base, a frame or yoke mounted therein and adapted to rock or tip laterally, a locking device adapted to engage with and to hold the frame or yoke at any desired angle of adjustment, and a vertical stem swiveled in said yoke and supporting the entire chair-body.

14. In a chair, the combination of a base, a yoke or frame suspended therein and adapted to tip or rock laterally, a locking device adapted to engage said yoke or frame and hold it in any desired inclination, and a chair-body supported by said yoke or frame and pivotally attached thereto, whereby the chair-body may be tipped to any desired angle forward and backward, the chair-body being connected with the yoke or frame by a swivel, whereby it is adapted to rotate independently of the yoke or frame.

15. The combination, substantially as set forth, of a supporting-frame, a seat, bars W, suspended from said seat and carrying a rest for the limbs, a swing-frame, R, suspended from the supporting-frame, constructed to carry the front end of the seat, and having studs *e'*, and hooks Y, pivotally attached to the bars W and constructed to engage with or be disengaged from said studs *e'* at will, whereby the leg-rest may be held in a vertical or horizontal position while the seat and back are in a common plane.

In testimony whereof I affix my signature in presence of two witnesses.

FRANK E. CASE.

Witnesses:
HARRY FREASE,
JOSEPH FREASE.